United States Patent [19]

Young et al.

[11] Patent Number: 5,619,553
[45] Date of Patent: Apr. 8, 1997

[54] METHOD OF CONDUCTING AN INTERCOM COMMUNICATION BETWEEN TWO CORDLESS TELEPHONE HANDSETS

[75] Inventors: Philip A. Young, Camberley; Michael Beatty, Richmond, both of Great Britain

[73] Assignee: Vtech Communications, Ltd., Hong Kong, Hong Kong

[21] Appl. No.: 252,260

[22] Filed: Jun. 1, 1994

[30] Foreign Application Priority Data

Jun. 2, 1993 [GB] United Kingdom ............ 9311298

[51] Int. Cl.$^6$ .................................. H04Q 7/24
[52] U.S. Cl. .................. 379/61; 379/63; 455/51.1
[58] Field of Search .................... 379/61, 63, 156, 379/159, 58, 59; 455/33.1, 54.1, 56.1, 51.1; 395/200.5, 290, 299; 364/230.4, 242.92, 269, 931.44, 931.48, 942.4

[56] References Cited

U.S. PATENT DOCUMENTS

| 4,882,746 | 11/1989 | Shimada | 379/63 |
|---|---|---|---|
| 4,893,334 | 1/1990 | Parnello | 379/157 |
| 5,027,347 | 6/1991 | Malkki | 379/159 |
| 5,140,628 | 8/1992 | Murata et al. | 379/63 |
| 5,247,567 | 9/1993 | Hirano | 379/61 |
| 5,285,443 | 2/1994 | Patsiokas et al. | 379/63 |

FOREIGN PATENT DOCUMENTS 2240690  8/1991  United Kingdom .

*Primary Examiner*—Dwayne D. Bost
*Assistant Examiner*—William G. Trost
*Attorney, Agent, or Firm*—Dick and Harris

[57] ABSTRACT

A method of conducting an intercom communication between two cordless telephone handsets is disclosed wherein a handset requests that the base unit designate the handset with temporary master status upon initiation of an intercom communication. The responsibility of providing master system timing is transferred from the base unit to the handset for the duration of the intercom call. Upon conclusion of the intercom call the responsibility of providing master system timing is returned to the base unit.

5 Claims, 1 Drawing Sheet

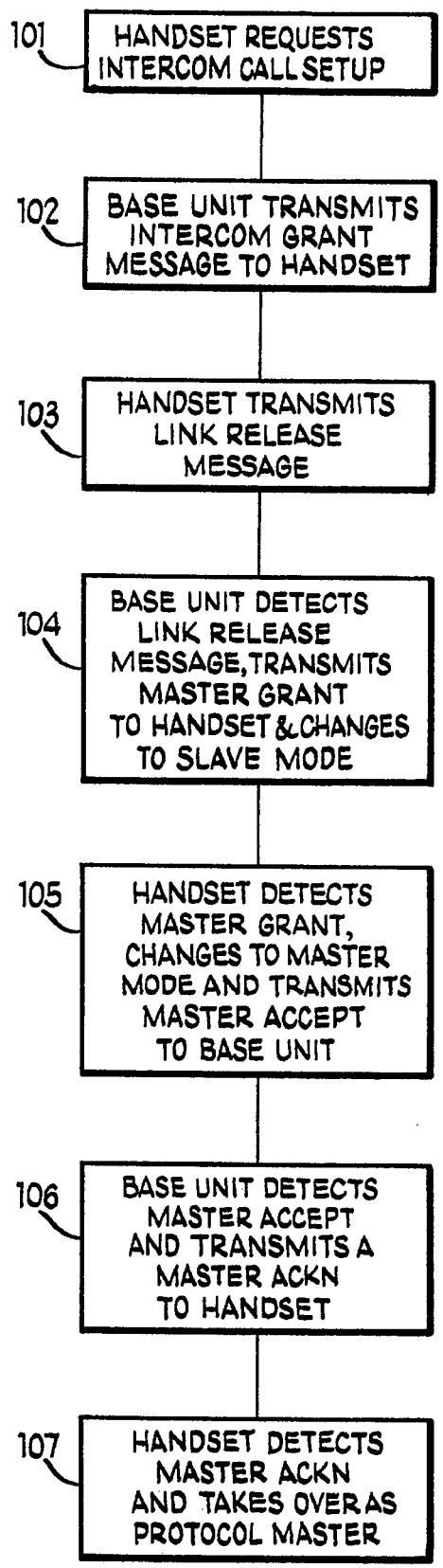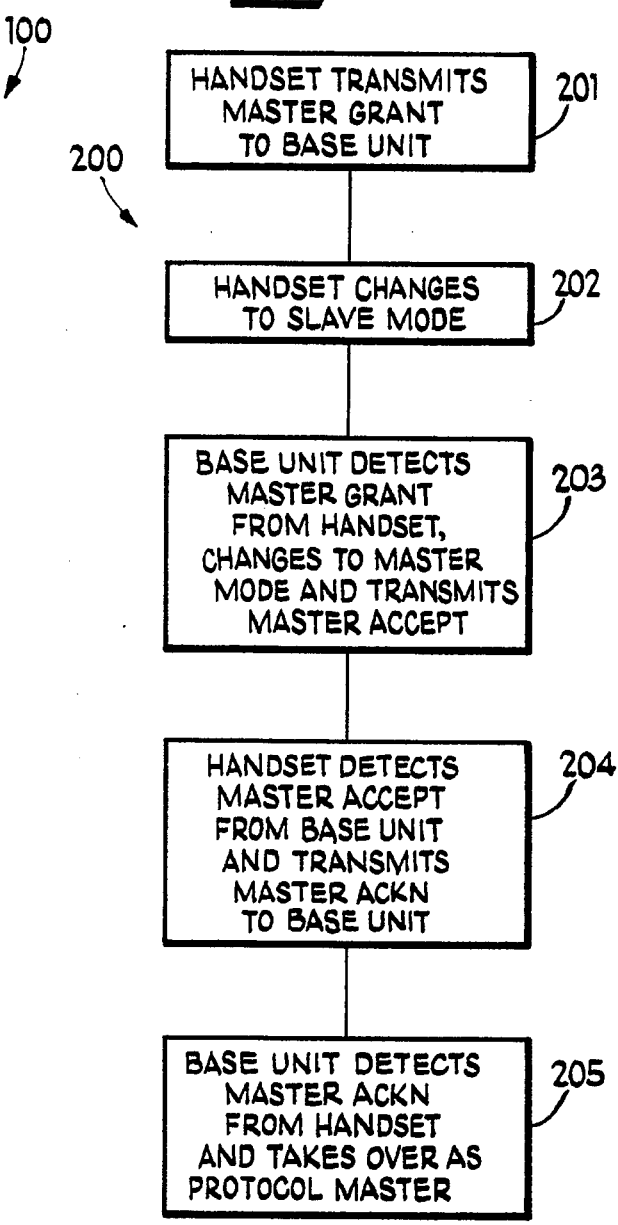

METHOD OF CONDUCTING AN INTERCOM COMMUNICATION BETWEEN TWO CORDLESS TELEPHONE HANDSETS

BACKGROUND OF INVENTION

1. Technical Field

The present invention relates generally to operating a cordless telephone device and specifically to a method of conducting an intercom communication between two cordless telephone handsets in a telephone system incorporating a single base unit and multiple battery powered telephone handsets. While the present invention has utility in any timing critical master—slave system having a master clock generator and associated slave devices synchronizing to the master device, the invention has been disclosed in a cordless telephone embodiment wherein multiple radio transmitter/receivers transmit and receive signals on two or more radio frequencies, such as found in a system implementing a continuous frequency hopping and/or time division duplex protocol.

2. Background Art

Cordless telephones usually consist of one base unit and one handset. The base unit sends voice and data signals to its associated handset and receives voice and data signals from the handset over a radio frequency link. The data signals are utilized by the base unit to manipulate the subscriber telephone line, which is connected to the base unit. For instance, the base unit detects a ring signal on the telephone line and may further place the telephone line in an off-hook state if so directed by the user. The base unit further processes voice signals and transmits and receives both voice and data signals.

Another function typically provided in a prior art cordless telephone is the ability to conduct an intercom conversation between a base unit and remote handset. In an intercom mode a communication link is established between the base unit and the handset in the normal manner. If the base unit initiates the intercom mode the handset typically sounds a tone alerting the user that the base unit is attempting to open a communication channel between the base unit and the handset. The intercom tone typically differs from the tone used to alert the user that the base unit is attempting to open a communication channel to the handset for purposes of processing an outside telephone call. Alternatively, the handset may initiate the intercom mode and signal the base unit accordingly.

Unlike the processing of a conventional telephone call, be it outgoing or incoming, no connection is made to the subscriber telephone line during an intercom call between the handset and base unit.

Prior art cordless telephone devices which contain provisions for conducting intercom communications between a base unit and a handset, particularly a timing critical cordless telephone device which transmits and receives radio signals on two or more radio frequencies implementing a continuous frequency hopping and/or time division duplex protocol, do not include the ability to have two handsets conduct an intercom communication independent of the base unit. Such systems are by design extremely time critical and is wholly dependent upon synchronizing each of the radio transmitter/receiver which make up the system so that communication channels may be opened. One radio transmitter/receiver is typically designated as the master and serves to provide master timing. All other radios in the system, designated slaves, synchronize themselves to the master. Without the ability to synchronize, no radio can communicate with another radio in the system. Thus, omitting the base unit from the communication link would in prior art systems deny the handsets access to the master system timing being maintained by the base unit such that, in a frequency hopping and/or time division duplex system, no two handsets could synchronize or communicate with one another.

Accordingly, it is an object of the present invention to provide a method of conducting an intercom call between two handsets in a cordless telephone wherein multiple radio transmitter/receivers transmit and receive signals on two or more radio frequencies implementing a continuous frequency hopping and/or time division duplex protocol.

It is a further object of the present invention to provide a method for designating a handset as temporary timing master for the duration of an intercom call and relinquishing all master status upon completion of the call.

These and other objects of the present invention will become apparent in light of the present application, specification, claims and drawings.

SUMMARY OF THE INVENTION

A preferred embodiment of invention relates to a method for conducting an intercom conversation between two handsets which, together with a master base unit comprise a cordless telephone system which operates in a frequency hopping spread spectrum and/or time division duplexing mode.

In a conventional communication mode, communication is established via a radio link between a handset and the base unit where communication may take the form of an outgoing or incoming telephone call, an intercom call, or other maintenance operations which must take place between a handset and base unit.

If two handsets desire to engage in an intercom call between one another, a direct link is established between the two handsets, independent of the base unit. However, under normal operating conditions, exclusive of handset to handset communication, the base unit provides master timing for all of the radio units (master and slaves) which comprise the telephone system. Accordingly, a communication link which is established directly between two handsets excludes the base unit from active participation and precludes its ability to function as the system timing master. Accordingly, to conduct a handset to handset intercom call the role of timing master is passed from the base unit to the handset which initiates the intercom call. Upon completion of the intercom call, the handset initiating the intercom call relinquishes the role of system timing master and passes the function back to the base unit.

DESCRIPTION OF THE DRAWINGS

FIG. 1 of the drawings is a block diagram illustrating the steps comprising the method of handing over time master status from the base unit to the handset; and FIG. 2 of the drawings is a block diagram illustrating the steps comprising the method of returning time master status to the base unit from the handset.

DETAILED DESCRIPTION OF THE DRAWINGS

While this invention is susceptible of embodiment in many different forms and in many different systems, there is shown in the drawings and will herein be described in detail, one specific embodiment in one representative system with the understanding that the present disclosure is to be considered as an exemplification of the principles of the invention and is not intended to limit the invention to the embodiment or the system illustrated.

FIG. 1 of the drawings discloses one embodiment of the invention the method of conducting an intercom communication between two cordless telephone handsets, and specifically the method 100 of transferring from the master radio transmitter/receiver to the one of the two or more slave radio transmitter/receivers the responsibility of providing master timing for the system upon an intercom call between two of the two or more slave radio transmitter/receivers. The method comprises the following steps.

The slave radio transmitter/receiver, i.e. a handset, transmits to the master radio transmitter/receiver, i.e. a base unit, a request to initiate an intercom call to another handset, step 101. Upon receiving from the handset a request to initiate an intercom call the base unit transmits to the handset a message granting the handset's request to initiate an intercom call, step 102.

Upon receiving from the base unit the message granting the handset's request to initiate an intercom call, the handset transmits a link release message to the base unit, step 103. The base unit upon receiving the link release message in turn transmits to the handset a message granting the handset's request for master status and transfers into a slave mode, step 104. The handset, in turn, upon receiving the message granting master status transfers into master status mode and transfers to the base unit a message accepting the transfer of master timer, step 105.

The base unit upon receiving a MASTER ACCEPT message from the handset indicating that the handset has accepted the role as master timer, in turn, transmits to the handset a MASTER ACKN message signifying to the handset that the master has acknowledged that the handset is operating in the master mode serving as the master timer, step 106.

Upon the handset's receipt of the MASTER ACKN message, the handset takes over as the master for the telephone system, step 107.

Associated with each step is a time-out function whereby the system is able to recognize that a message which either the base unit or handset expects to receive has in fact not been received within an allotted time. Should any of such time-outs expire it is assumed that the attempt to temporarily transfer master status from the base unit to the handset has failed. Upon such failure the handset shall revert into the slave mode and the base unit shall revert into the master mode.

The handset upon assuming master mode status will act in most respects as though it were the base unit and, in particular, it shall provide synchronization maintenance to the other handset and the base unit.

FIG. 2 of the drawings discloses one embodiment of the invention the method of conducting an intercom communication between two cordless telephone handsets, and specifically the method 200 of returning to master radio transmitter/receiver from the temporary master the responsibility of providing master timing for the system upon conclusion of an intercom call between two of the two or more slave radio transmitter/receivers. The method comprises the following steps.

Upon conclusion of an intercom call, the handset which initialized the intercom call, the temporary master, will transmit to the base unit a message granting to the base unit timing master status, step 201. The temporary master, the handset, will then revert to the slave mode, step 202.

In response to the base unit receiving the message granting timing master status message the master will revert to the master mode and transmit to the handset a MASTER ACCEPT message, step 203, indicating that the master has accepted the grant of timing master from the temporary master, the handset.

The handset, in turn, upon receiving the MASTER ACCEPT message transmits to the base unit a MASTER ACKN message acknowledging the acceptance of the grant of timing master status, step 204.

Upon the base unit receiving the MASTER ACKN message from the handset, acknowledging acceptance of the grant of timing master status, the base unit will take over as the timing and protocol master, step 205.

Again, Associated with each step is a time-out function whereby the system is able to recognize that a message which either the base unit or handset expects to receive has in fact not been received within an allotted time. Should any of such time-outs expire it is assumed that the attempt to return temporary master status to the base unit has failed. Upon such failure the handset shall revert into the slave mode and the base unit shall revert into the master mode.

The foregoing description and drawings merely explain and illustrate the invention and the invention is not limited thereto, except insofar as the appended claims are so limited and as those skilled in the art who have the disclosure before them will be able to make modifications and variations therein without departing from the scope of the invention.

What is claimed is:

1. A method of conducting an intercom communication between two cordless telephone handsets, in a system having:

a master radio transmitter/receiver designated as system master, the system master being responsible for maintaining system timing;

two or more radio transmitter/receivers designated as slaves which synchronize to the system master, each of the radio transmitter/receivers being capable of transmitting and receiving signals between one another on two or more radio frequencies, the method comprising the steps of:

one of the two or more slave radio transmitter/receivers requesting from the master radio transmitter/receiver temporary system master status upon user initiation of an intercom communication at the one of the two or more slave radio transmitter/receivers;

transferring from the master radio transmitter/receiver to the one of the two or more slave radio transmitter/receivers the responsibility of providing master timing for the system;

conducting the intercom communication directly between the one of the two or more slave radio transmitter/receivers and at least another of the two or more slave radio transmitter/receivers, exclusive of the master radio transmitter/receiver with the one of the two or more slave radio transmitter/receivers providing master system timing; and transferring from the one of the two or more slave radio transmitter/receivers to the master radio transmitter/receiver the responsibility of providing master timing for the system upon conclusion of the intercom communication between the one of the two or more slave radio transmitter/receivers and at least another of the two or more slave radio transmitter/receivers.

2. The method according to claim 1 wherein the step of requesting from the master radio transmitter/receiver temporary master status comprises the substeps of:

transmitting from the one of the two or more slave radio transmitter/receivers to the master radio transmitter/receiver a request to initiate the intercom communication with the at least another one of the two or more slave radio transmitter/receivers;

transmitting from the master radio transmitter/receiver to the one of the two or more slave radio transmitter/receivers a message granting the request to initiate the intercom communication; and transmitting from the one of the two or more slave radio transmitter/receivers to the master radio transmitter/receiver a link request message.

3. The method according to claim 2 wherein the step of transferring from the master radio transmitter/receiver to the one of the two or more slave radio transmitter/receivers further comprises the substeps of:

transmitting from the master radio transmitter/receiver, in response to receiving said link request message on the master radio transmitter/receiver, a message granting to the one of the two or more slave radio transmitter/receivers the timing master status;

in response to receiving the timing master status message on the one of the two or more slave radio transmitter/receivers, transferring the one of the two or more slave radio transmitter/receivers into master mode and transmitting from the one of the two or more slave radio transmitter/receivers a message accepting the grant of the timing master status;

in response to receiving said message accepting the grant of timing master status on the master radio transmitter/receiver, transmitting from the master radio transmitter/receiver a message acknowledging the acceptance of the grant of the timing master status; and in response to receiving said message acknowledging acceptance of the grant of the timing master status, making the one of the two or more slave radio transmitter/receivers temporary master responsible for maintaining system timing.

4. A method of transferring timing master status from a master radio transmitter/receiver to a slave radio transmitter/receiver in a system having:

the master radio transmitter/receiver which maintains system timing;

two or more slave radio transmitter/receivers which synchronize to the master radio transmitter/receiver, each of the master and slave radio transmitter/receivers being capable of transmitting and receiving signals between one another on one of two or more radio frequencies, the method comprising the steps of:

transmitting from a requesting one of the two or more slave radio transmitter/receivers to the master radio transmitter/receiver a request to initiate a communication with another slave radio transmitter/receiver;

transmitting from the master radio transmitter/receiver to the requesting slave radio transmitter/receiver a message granting the request to initiate the communication;

transmitting from the requesting slave radio transmitter/receiver to the master radio transmitter/receiver a link request message;

in response to receiving the link request message on the master radio transmitter/receiver transmitting from the master radio transmitter/receiver a message granting to the requesting slave radio transmitter/receiver the timing master status;

in response to receiving the timing master status grant message on the requesting slave radio transmitter/receiver, transferring the requesting slave radio transmitter/receiver into master mode and transmitting from the requesting slave radio transmitter/receiver a message accepting the grant of the timing master status;

in response to receiving said message accepting the grant of the timing master status on the master radio transmitter/receiver, transmitting from the master radio transmitter/receiver a message acknowledging the acceptance of the grant of the timing master status; and in response to receiving said message acknowledging acceptance of the grant of the timing master status by the requesting slave radio transmitter/receiver, making the requesting slave radio transmitter/receiver temporary master responsible for maintaining system timing.

5. A method of returning timing master status to a master radio transmitter/receiver from a temporary master, slave radio transmitter/receiver in a system having:

the master radio transmitter/receiver which maintains system timing;

two or more slave radio transmitter/receivers which synchronize to the master radio transmitter/receiver, each of the master and slave radio transmitter/receivers being capable of transmitting and receiving signals between one another on one or two or more radio frequencies, the method comprising the steps of:

concluding communication directly between the temporary master, slave radio transmitter/receiver and at least another of the two or more slave radio transmitter/receivers, exclusive of the master radio transmitter/receiver wherein the temporary/master, slave radio transmitter/receiver provided and maintained the system timing;

transmitting from the temporary master, slave radio transmitter/receiver to the master radio transmitter/receiver a message granting to the master radio transmitter/receiver timing master status and returning the temporary master, slave radio transmitter/receiver to slave status;

in response to receiving the message granting the timing master status message on the master radio transmitter/receiver, returning the master radio transmitter/receiver to master mode and transmitting from the master radio transmitter/receiver a message accepting the grant of the timing master status;

in response to receiving the message accepting the grant of the timing master status on the temporary master, slave radio transmitter/receiver, transmitting from the temporary master, slave radio transmitter/receiver a message acknowledging the acceptance of the grant of the timing master status; and in response to receiving the message acknowledging acceptance of the grant of the timing master status on the master radio transmitter/receiver, transferring to the master radio transmitter/receiver the system timing.

* * * * *